United States Patent [19]

Chen

[11] Patent Number: 4,751,714
[45] Date of Patent: Jun. 14, 1988

[54] LASER SYSTEM WITH IMPROVED GASEOUS RAMAN SCATTERING CELL

[75] Inventor: Da-Wun Chen, Binghamton, N.Y.

[73] Assignee: General Electric Company, Binghamton, N.Y.

[21] Appl. No.: 2,608

[22] Filed: Jan. 12, 1987

[51] Int. Cl.$^4$ .............................................. H01S 3/22
[52] U.S. Cl. ...................................... 372/60; 372/3; 372/20; 372/108
[58] Field of Search ..................... 372/20, 33, 3, 103, 372/108, 109, 60

[56] References Cited

U.S. PATENT DOCUMENTS 4,327,337  4/1982  Liu ........................................ 372/20
4,599,725  7/1986  George ................................... 372/3

Primary Examiner—James W. Davie
Assistant Examiner—Xuan Vo
Attorney, Agent, or Firm—I. David Blumenfeld

[57] ABSTRACT

A laser system having a gaseous Raman cell incorporate methane ($CH_4$) as the Raman scattering medium. The cell includes gaseous hydrogen to prevent deposition of carbonaceous material from decomposed methane on the windows of the Raman cell.

13 Claims, 1 Drawing Sheet

LASER SYSTEM WITH IMPROVED GASEOUS RAMAN SCATTERING CELL

BACKGROUND OF THE INVENTION

This invention relates to a tunable laser system and, more particularly, a laser system utilizing Raman scattering in which decomposition of the gaseous Raman scattering medium is suppressed.

FIELD OF THE INVENTION

Laser systems which incorporate a Raman scattering medium to shift the frequency of the laser output beam are well known. In such systems the output beam from a lasing material such as a Solid State Face Pumped Laser is focused on a cell containing a gaseous Raman scattering medium. Interaction with the vibrational mode of the gaseous molecules occurs and a part of the pump beam energy is converted to a second beam at a different wavelength. Thus, systems incorporating Raman scattering cells are highly useful in providing tunable laser systems. One gaseous Raman medium which has high conversion efficiency and good wavelength shift is methane ($CH_4$). It has been found, however, that $CH_4$ decomposes spontaneously into carbon and hydrogen when subjected to high intensity beams. The decomposition rate of the $CH_4$ is dependent on the temperature with the decomposition rate increasing with temperature.

Carbon released by the decomposition of the methane tends to be deposited on the inside of the transparent windows of the Raman cell. Obviously, decomposition of the methane and loss of the carbon by deposition results in progressive loss of the Raman scattering medium contained in the cell, thus limiting the life of the cell. The deposited carbon also degrades transmission of the pump beam and if built up to a sufficient thickness will ultimately block transmission of the beam. Heating effects resulting from absorption of the laser beam by the deposited carbonaceous layer can ultimately damage the window.

The deposition of carbonaceous material on the cell window due to decomposition of the Raman scattering methane is, unfortunately, also a self-reinforcing mechanism. That is, when a small amount of carbon is deposited on the windows, it absorbs energy from the pump laser beam and heats the carbonaceous layer. This raises the temperature of the methane layer in the vicinity of the window. Since the decomposition reaction rate is directly dependent on temperature, the rate of $CH_4$ decomposition is increased and more deposits accumulate on the window until a substantial portion of the methane is decomposed and ultimately sufficient carbon is deposited on the window to block transmission of the laser beam.

SUMMARY OF THE INVENTION

Applicant has found that loss of the Raman scattering methane gas may be substantially suppressed and deposition of carbon on the Raman cell windows substantially prevented by maintaining the methane decomposition and methane formation reactions in equilibrium so that the rate of decomposition of methane to carbon and hydrogen is essentially equaled by the combining reaction of hydrogen and carbon to form methane. This is achieved by adding free gaseous hydrogen to the high pressure methane Raman cell. The excess gaseous hydrogen maintains the methane in an equilibrium state and prevents carbon deposition on the window since free carbon is used in the recombination reaction to form methane as rapidly as it is released by methane decomposition reaction.

It is, therefore, a principal objective of this invention to provide a Raman cell arrangement in which decomposition of the gaseous Raman medium and deposition of carbon is substantially suppressed.

Another objective of the invention is to provide a tunable laser system incorporating a gaseous Raman cell in which carbon deposition is suppressed.

Still another objective of the invention is to provide a laser system with an improved gaseous Raman cell component.

Other objectives and advantages of the invention will become apparent as the description thereof proceeds.

The advantages of the invention are achieved in a tunable laser system which incorporates a gaseous Raman cell. The Raman cell is characterized by the fact that the gaseous Raman medium contained therein, preferably methane, also includes a predetermined amount of free gaseous hydrogen so that the methane decomposition and methane formation reactions are maintained in equilibrium, thereby suppressing formation of carbon layers on the Raman cell windows. The amount of gaseous hydrogen to be incorporated depends on the temperature and the equilibrium constant for the reaction which is thus a function of the partial pressures of hydrogen and methane.

The novel features of invention are set forth with particularity in the appended claims. The invention itself, however, as to its organization and mode of operation, together with further objectives and advantages thereof, may best be understood by reference to the following description taken in conjunction with the accompanying drawing in which:

DETAILED DESCRIPTION OF THE INVENTION

Figure 1:
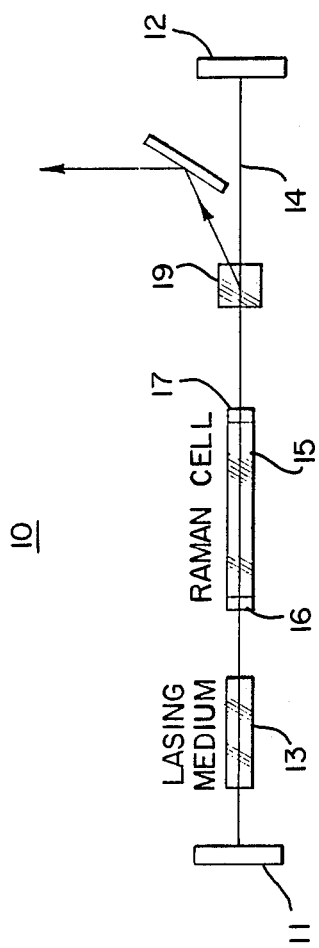
FIG. 1 is a block diagram showing a laser cavity incorporating a gaseous Raman conversion cell.

FIG. 1 illustrates a laser cavity 10 defined by mirrors 11 and 12. A lasing medium 13 such as a Nd:YAG laser, or the like, is disposed between mirrors 11 and 12 and aligned therewith so that a beam of coherent electromagnetic radiation 14 will pass through said lasing medium in an optical path between mirrors 11 and 12. A Raman cell 15 is disposed in optical alignment with the lasing medium 13 in cavity 10. Raman cell 15 comprises a pair of windows, 16 and 17, preferably of magnesium fluoride, although fused silica is a viable alternative. A gaseous Raman scattering medium is diposed in the interior of the cell between the windows.

The gaseous Raman medium is preferably $CH_4$ because of its high conversion efficiencies and good wavelength shift. Also included in the interior of the cell is a quantity of gaseous hydrogen to suppress deposition of carbonaceous material on the surface of the windows. Laser cavity 10 also includes a dispersive element 19 for coupling a particular output wavelength out of the laser cavity.

The laser element is pumped from a source of excitation, such as flashlamps, not shown, to produce a laser beam which passes through Raman cell 15 a plurality of times as it oscillates between mirrors 11 and 12. Interaction of the beam energy with the vibration of the Raman medium molecules shifts the laser frequency by characteristic frequency of the Raman medium to produce an output beam having a frequency, $W_r$, equal to the pump laser frequency, $W_o$, minus the Raman frequency, $\Delta W_R$.

As pointed out briefly above, a gaseous Raman scattering medium such as $CH_4$ when subjected to laser radiation spontaneously decomposes into carbon and gaseous hydrogen, with the rate of decomposition being temperature dependent. While a certain portion of the carbon and gaseous hydrogen decomposition products will recombine into methane, it has been found that near the surface of the Raman cell windows carbon particles are deposited on the window. Such deposited particles are no longer available for recombination with the hydrogen to form methane.

Unfortunately, this process is not self-limiting. In fact, the deposited carbons begin to absorb more and more of the laser energy. This increases the temperature of the gas in the vicinity of the windows, thus increasing the decomposition reaction rate so that more and more methane is consumed until the cell operates very poorly.

The decomposition and recombination reactions of the methane is described by the following formula:

$$CH_4 \longleftrightarrow C + 2H_2$$

By adding free gaseous hydrogen to the gaseous methane, the excess gaseous hydrogen present throughout the medium is available to react with any carbon from the methane decomposition reaction to form $CH_4$. The amount of free gaseous hydrogen remains essentially constant since any gaseous hydrogen consumed in the recombination reaction is balanced by an equal amount of free gaseous hydrogen produced when the methane decomposes. Thus, there is always an adequate amount of free gaseous hydrogen available in the vicinity of any carbon decomposition product so that recombination to form methane takes place prior to and preferentially to the deposition of the carbon particles on the surface of the windows.

By maintaining the reactions in equilibrium, the deposition of the carbonaceous deposits can be prevented. The equilibrium constant K for these reactions is determined by the relative partial pressures of hydrogen and methane. The equilibrium constant K is defined as follows:

$$K = [P(H_2)]^2 / [P(CH_4)]$$

where
$P(H_2)$ = partial pressure of hydrogen
$P(CH_4)$ = partial pressure of methane,
with both units being in atmosphere pressure. The equilibrium constant for the $CH_4$ decomposition and recombination reactions, at various temperatures, are known. Therefore, at any given temperature and for any given methane pressure, the partial pressure of the gaseous hydrogen can be readily determined. In a table below the equilibrium constants and the equilibrium partial pressures of gaseous hydrogens are listed for a Raman cell with a 1,000 psi methane gas:

| T (°C.) | K | (PCH2)-PSI |
|---|---|---|
| 400 | $5.66 \times 10^{-2}$ | 31 |
| 500 | $4.22 \times 10^{-1}$ | 86 |

-continued

| T (°C.) | K | (PCH2)-PSI |
|---|---|---|
| 600 | 2.09 | 175 |

Thus, for example, at temperatures below 400° C. a partial press of 31 psi of free gaseous hydrogen is necessary in order to maintain the reactions in equilibrium and to prevent carbon from depositing on the cell window. Similarly, as the temperature goes up the equilibrium constant changes so that greater hydrogen partial pressures are necessary to maintain the equilibrium since the rate of decomposition increases with temperature. At 500° C. gaseous hydrogen partial pressure of 86 psi is necessary, and a 175 psi partial pressure of gaseous hydrogen is required at 600° C. Thus, for any temperature and any pressure of methane in the cell a predetermined amount of gaseous hydrogen can be included to maintain the desired partial pressure to maintain the reaction equilibrium and to prevent deposition of carbonaceous particles on the cell windows.

It will be apparent from the foregoing, that a tunable laser system of the type using a gaseous Raman scattering cell for frequency shifting has been described in which operation of the Raman cell can be enhanced at various temperatures by preventing decomposition of the Raman scattering gaseous medium such as $CH_4$ by adding free gaseous hydrogen to the cell. The effect of the gaseous hydrogen is to maintain the decomposition and recombination reactions in equilibrium thereby preventing the deposition of carbonaceous particles on the cell windows as well as preventing consumption of the methane Raman medium.

While a preferred embodiment of the present invention has been shown and described herein, it will obvious that such embodiment is provided by way of example only. It will, of course, be understood that the invention is not limited thereto, since many modification as to the arrangement and components utilized therein may be made. It is contemplated by the appended claims to cover any such modifications which fall within the true spirit and scope of this invention.

What is claimed as new and desired to be secured by U.S. Letters Patents is:

1. In a laser system comprising:
   (a) an optical cavity
   (b) a lasing element positioned in said cavity to generate a beam of coherent radiation at a first frequency,
   (c) a gaseous Raman cell containing a first gaseous medium for producing a Raman interaction with said beam of coherent radiation of a first frequency, said cell being positioned in said cavity to convert a portion of said coherent radiation of said first frequency to coherent radiation of a second frequency,
   (d) a second gaseous medium incorporated in said Raman cell to suppress deposition of a constituent of the gaseous Raman scattering medium in said cell caused by decomposition of the gaseous Raman medium.

2. The laser system according to claim 1 wherein said Raman cell contains an organic gaseous Raman medium.

3. The laser system according to claim 2 including means for suppressing deposition of free carbon from said organic medium in said cell.

4. The laser system according to claim 3 wherein said Raman cell contains pressurized methane.

5. The laser system according to claim 1 wherein said suppressing means comprises a quantity of free gas of the sort formed during decomposition of the gaseous Raman medium.

6. The laser system according to claim 4 wherein said cell contains free gaseous hydrogen along with said methane.

7. The laser system according to claim 6 wherein the amount of free hydrogen is sufficient to maintain the decomposition and reformation reaction of said methane and its constituents in equilibrium.

8. The laser system according to claim 7 wherein the amount of free hydrogen at any given methane pressure and at any given temperature is adequate according to the following relationship:

$$K_T[P(CH_4)] = [P(H_2)]^2$$

to maintain the reactions in equilibrium;
where:
  $K_T$ = the equilibrium constant for $CH_4$ at any given temperature,
  $P(CH_4)$ = the methane partial pressure, and
  $P(H_2)$ = the partial pressure of free hydrogen.

9. A Raman scattering cell comprising:
(a) a cell housing,
(b) windows at each end of the housing transparent to laser radiation,
(c) a gaseous Raman scattering medium in said housing,
(d) an additional different gaseous medium in said housing for suppressing deposition of decomposition constituents of the gaseous Raman medium in said housing and on said windows whereby said different gaseous medium recombines with the decomposition constituent to reform said gaseous Raman medium.

10. The Raman scattering cell according to claim 9 wherein said suppressing means comprises a quantity of free gas of the sort formed during decomposition of the gaseous Raman medium.

11. The Raman scattering cell according to claim 10 wherein the Raman medium is methane and said gaseous suppressant is hydrogen.

12. The Raman scattering cell according to claim 11 wherein the amount of free hydrogen is sufficient to maintain the decomposition and reformation reactions of methane in equilibrium thereby suppressing carbon deposition on said windows.

13. The Raman scattering cell according to claim 12 wherein the amount of free hydrogen at any given methane pressure is adequate to maintain the reactions in equilibrium according to the following relationship:

$$K_T[P(CH_4)] = [P(H_2)]^2,$$

where
  $K_T$ = the equilibrium constant for $CH_4$ at any given temperature,
  $P(CH_4)$ = the methane partial pressure and
  $P(H_2)$ = the partial pressure of free hydrogen.

* * * * *